Dec. 9, 1958 R. S. JOSE 2,863,942

PULSE GENERATOR

Filed July 28, 1955 2 Sheets-Sheet 1

INVENTOR.
ROBERT S. JOSE
BY F.A. Rechif
ATTORNEY

Dec. 9, 1958 R. S. JOSE 2,863,942

PULSE GENERATOR

Filed July 28, 1955 2 Sheets-Sheet 2

INVENTOR.
ROBERT S. JOSE
BY
F.A. Rechif
ATTORNEY 2,863,942
Patented Dec. 9, 1958

2,863,942

PULSE GENERATOR

Robert S. Jose, Moorestown, N. J., assignor to Radio Corporation of America, a corporation of Delaware Application July 28, 1955, Serial No. 524,994

6 Claims. (Cl. 178—7.1)

Figure 1A:
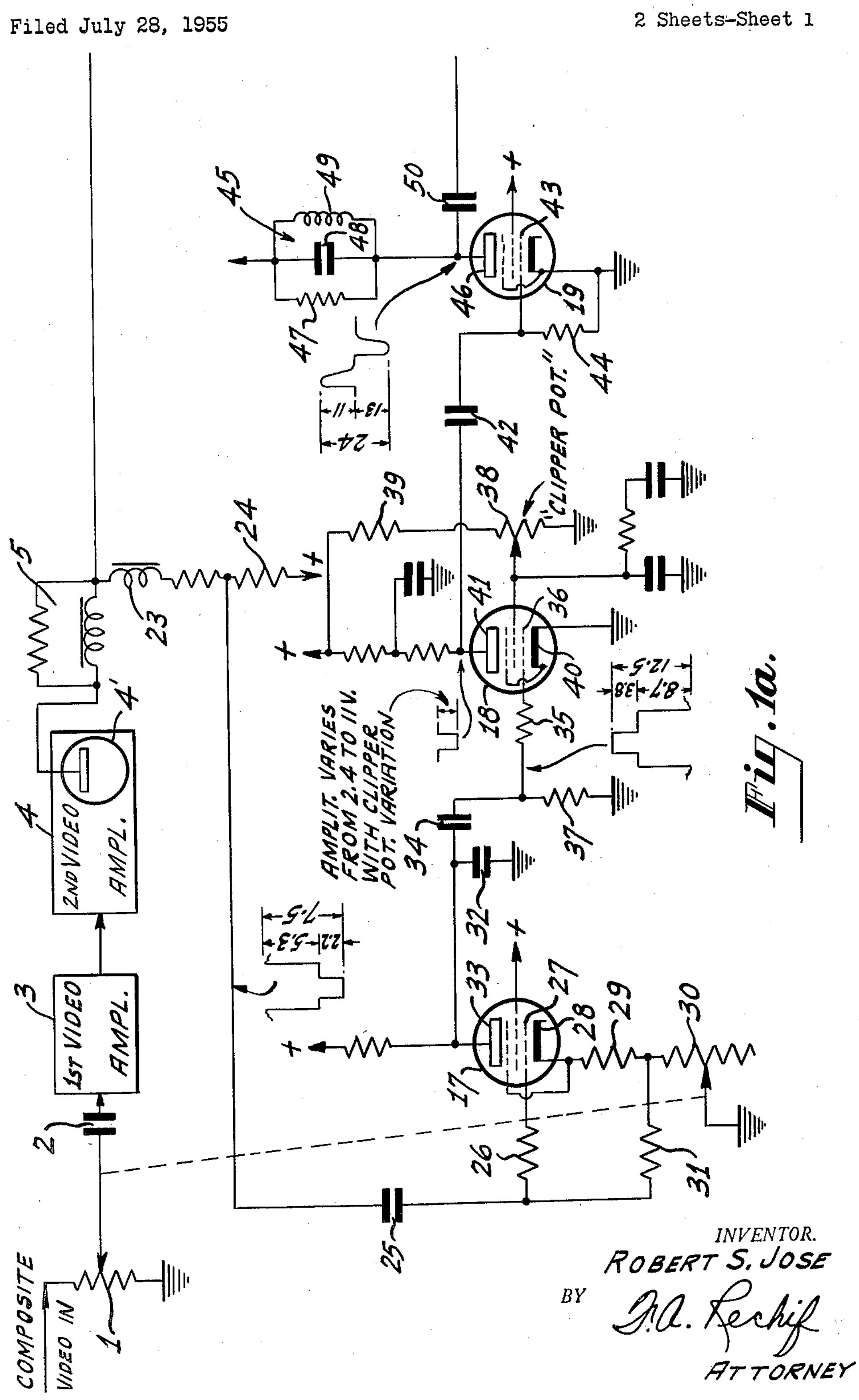

This invention relates to a pulse generator, and more particularly to a generator of keying pulses adapted for use in television (keyed) clamp circuits.

The modulator portion of a television (TV) transmitter commonly includes a clamp circuit for restoring or reinserting the missing or incorrectly represented direct current (D. C.) component, which has been lost as a result of alternating current (A. C.) coupling in the modulator prior to the point of reinsertion of the D. C. component. To retain this component in the transmitter, D. C. coupling must be employed in the modulator, from the reinsertion point on through the final amplifier. The D. C. component is usually reinserted under the control of recurring pulses bearing a predetermined relationship to a fixed datum level such as "picture black," these recurring pulses (herein termed "keying pulses") being used to drive or key a double diode clamping circuit which operates, either directly or through a D. C.-coupled amplifier, on the grid of the modulator tube. Double diode clamping circuits per se are well known and for a further description of the same reference may be had to Wendt Patent No. 2,299,945, issued October 27, 1942.

An object of this invention is to provide a novel keying pulse generator for keyed clamp circuits of TV transmitters.

Another object is to devise a keying pulse generator which is simpler and cheaper than those of the prior art.

A further object is to devise a keying pulse generator which, although set into operation by the synchronizing pulses, is quite insensitive to the precise shape or duration of such pulses, and which can also be made independent of the duration of the so-called "back porch."

A still further object is to devise a keying pulse generator in which, unlike some keying pulse generators of the prior art, the amplitude of the pulse generated is not limited by the available anode supply voltage.

The objects of this invention are accomplished, briefly, in the following manner: the synchronizing pulses are separated from the composite video signal and applied to the grid of a pulse former tube having a critically-damped parallel resonant circuit coupled to its anode. The onset of the synchronizing pulse cuts off this tube and causes a positive half-sine wave to be developed across the resonant circuit, while the decay of the synchronizing pulse causes the tube to conduct, in turn causing a negative half-sine wave to be developed across the resonant circuit. Only a single pulse is developed across this critically-damped resonant circuit in response to each edge of the synchronizing pulse applied to the pulse former tube. A clipper follows the pulse former tube, to remove the unused one of the two half-sine-wave pulses (either the positive or negative pulse may be removed, as desired, depending upon the manner in which the clipper is connected), and the keying pulse not so removed is applied to a phase splitter to produce oppositely-phased pulses which may be used for keying the double diode clamping circuit.

Figure 1B:
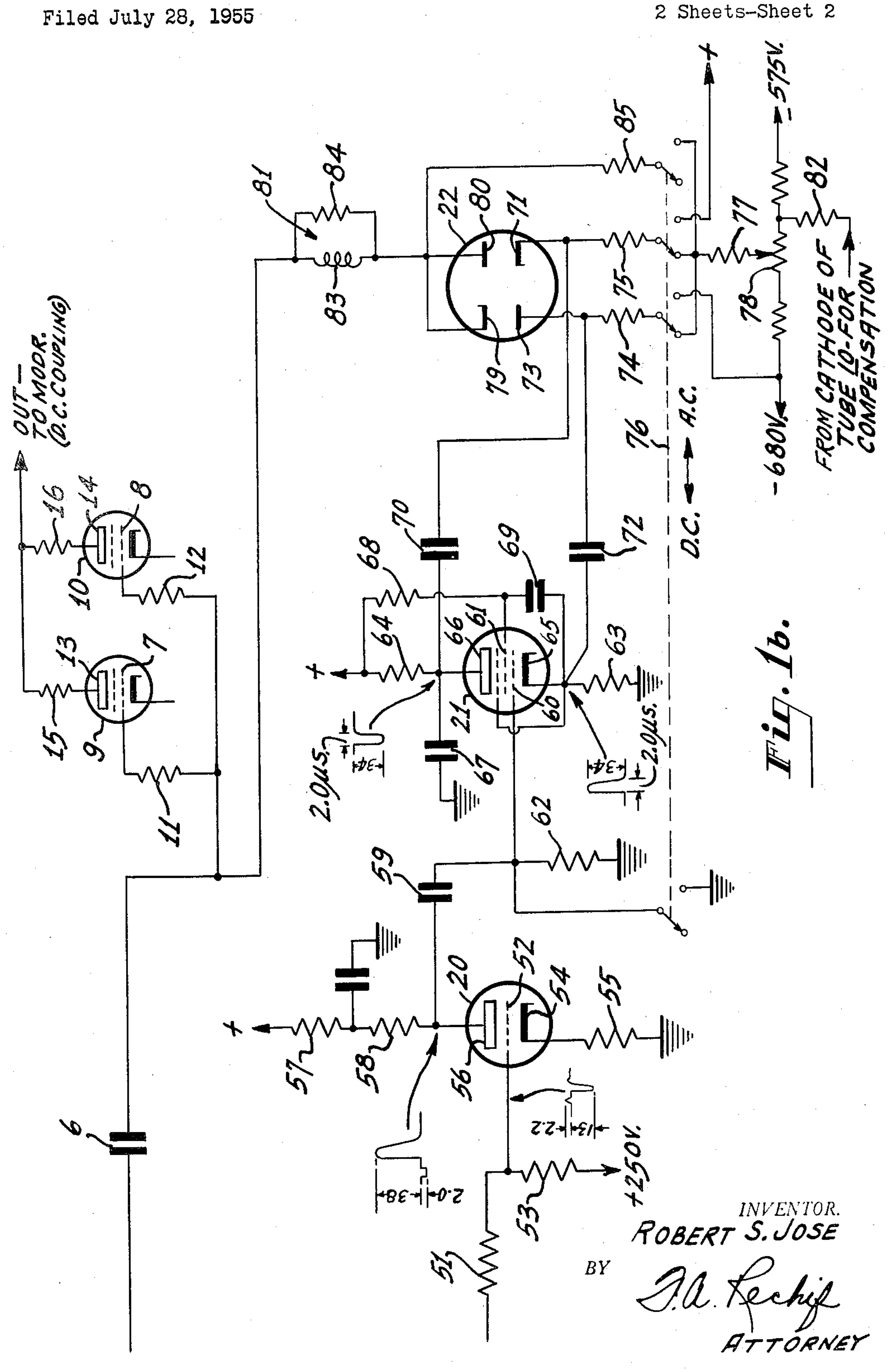

The foregoing and other objects of the invention will be best understood from the following description of an exemplification thereof, reference being had to the accompanying drawing, wherein the single figure (comprising Figs. 1*a* and 1*b* taken together) is a schematic diagram of a pulse generator circuit according to this invention, along with a portion of a modulator for a TV transmitter.

Referring to the drawing, the composite video signal comprising the signals representative of the optical values of an image being televised, and the blanking signals with the synchronizing signals superimposed thereon, are applied across a potentiometer 1 one end of which is connected to ground, and a selected portion of this composite video signal is fed from the movable arm of potentiometer 1 through a coupling capacitor 2 to the input of a first video amplifier 3. The term "ground," in the present specification, is to be understood as referring to a point of fixed or zero alternating potential. The amplified composite video signal from amplifier 3 is fed to the input of a second video amplifier 4 including a tube 4' from the anode of which the amplified composite video signal is applied by way of an LR shunt peaking network 5 and a capacitor 6 to the grids 7 and 8 of the respective parallel-connected third video amplifier tubes 9 and 10, by way of respective parasitic-suppressing resistors 11 and 12. The anode circuit of tube 4' includes a series peaking inductance 23. The tubes 9 and 10 may be type 807 vacuum tubes. The anodes 13 and 14 of the respective tubes 9 and 10 are connected by way of respective small-valued resistors 15 and 16 to a common point, and from this point the amplified composite video signal is fed to a modulator circuit (not shown), which is preferably of the type described in my Patent No. 2,679,029, dated May 18, 1954.

Capacitor 6 is the clamped capacitor, which means that the grids 7 and 8 are periodically and recurringly clamped to a certain fixed level. The output coupling from tubes 9 and 10 to the modulator must then be one capable of passing direct current, so that the D. C. component, once reinserted, will not be lost.

The keying pulse generator of this invention operates to provide the keying pulses necessary for the operation of the keyed double diode clamping circuit operating on grids 7 and 8, which circuit operates in turn to reinsert the TV D. C. component at such grids. At least one keyed clamp circuit is employed in the modulator of most TV transmitters.

The clamp circuit for the TV transmitter modulator illustrated, which circuit utilizes the keying pulse generator of this invention, includes several tubes arranged more or less in cascade and functioning as follows: a synchronizing pulse amplifier ("sync amplifier") 17, a synchronizing pulse separator ("sync separator") 18, a pulse former 19, a clipper 20, a phase splitter 21 and a clamp diode 22.

The input signal to the clamp circuit is taken from the anode circuit of the second video amplifier tube 4', being derived from across a resistor 24, and this signal is fed through a coupling capacitor 25 and a resistor 26 to the control grid 27 of the sync amplifier tube 17, which may be a type 6CL6 pentode vacuum tube. The input signal to the clamp circuit is represented by the waveform adjacent the lead between items 24 and 25. The cathode 28 of tube 17 is connected through a resistor 29 to one end of a gain control potentiometer 30 the movable tap on which is connected to ground, and a leak resistor 31 is connected from the junction of items 25 and 26 to the junction of items 29 and 30. The tap on potentiometer 30 is ganged with the video gain control on potentiometer 1, in such a way that the gain of tube 17 is reduced as the video gain control setting on potentiometer 1 is increased, and vice versa.

Considered as a unit, the entire clamp circuit will provide stable and reliable operation over a very wide range of operating level. This requirement is semi-unique to transmitters, in that the actual operating level is determined by the legal radiated power set forth in the station's license, by whether or not a linear amplifier is employed and by the adjustments of the radio frequency portions of the transmitter. All these factors are beyond the control of the equipment designer, and all extend the necessary stable range of operation of the TV transmitter modulator over that encountered elsewhere, for example in studio equipment.

According to this invention, the necessary stable operating range is effected by arranging the pentode tube 17 in the manner previously described, to wit, so that its gain is reduced as the input video gain control setting (and thereby the operating level) is increased. Since the input video gain control potentiometer 1 is effective on amplifier 4, from which signal is taken as the input to the clamp circuit including tube 17, the operating level increase and the gain reduction are in series. Therefore, a video signal whose synchronizing pulse portion (sync) is approximately constant in amplitude for any operating level requirement is presented to the sync separator tube 18 which follows sync amplifier 17. In other words, the result of the arrangement including the ganged potentiometer controls is that the amplitude of sync which appears in the anode circuit of tube 17 is approximately constant.

The constant amplitude sync on the video signal supplied for separation to sync separator 18 removes the limiting item which limits the stable operating range of previous modulators. In these units, if the sync amplitude becomes too small (corresponding to a reduced video gain setting), reliable and stable separation cannot be obtained. Conversely, the limit at high operating level comes when the video amplitude becomes so high as to cause the separation level (to be discussed hereinafter) to be below blanking, resulting in so-called "clamp streaking." In the system of the present invention, the sync separator 18 is unaware (to a good approximation) of any operating level change.

A bypass capacitor 32 is connected from the anode 33 of tube 17 to ground, while the amplified signal output of tube 17 is fed from anode 33 through a coupling capacitor 34 and a resistor 35 to the control grid 36 of the sync separator tube 18, a leak resistor 37 being connected from the junction of items 34 and 35 to ground. Tube 18 may be a pentode vacuum tube, the pentode portion of a type 6U8, for example. The amplifier tube 17 amplifies and inverts the composite video signal, as illustrated by the waveform representing the output of tube 17. The bypass capacitor 32 in the anode circuit of tube 17 effectively narrows the bandwidth of the sync channel so that spikes, overshoots into black of picture information, color TV subcarrier, etc., which are all high frequency phenomena, will not be fed to the sync separator 18 and then on to the pulse former 19 to cut the latter off and generate spurious keying pulses. However, the bandwidth of the circuit between tubes 17 and 18 is still adequate for the passage of sync and equalizing pulses.

The sync separator tube 18 is a sharp cutoff pentode tube with variable (low) screen grid voltage which is supplied thereto from the movable arm of a "clipper potentiometer" 38 one end of which is grounded and the opposite end of which is connected through a resistor 39 to the positive terminal of a unidirectional potential source. The clipping level of tube 18 is adjustable by means of this variable screen voltage. The low screen voltage of tube 18 makes the cutoff bias of this tube rather small. The polarity of the signal at the grid 36 is sync positive, as indicated by the waveform adjacent the common junction of items 34, 35 and 37. There is a leveling or D. C. restorer action by the grid 36, which acts as one electrode of a diode, to hold the tips of the sync at some nearly fixed value of voltage. Since the cathode 40 of tube 18 is grounded, the sync tips are leveled to approximately ground potential. Then, as the signal voltage on grid 36 drops away from the peak positive value of the sync tips, the voltage on this grid approaches cutoff bias for the tube. If the amplitude of the sync fed to grid 36 is high enough, cutoff bias will be reached before the black level or pedestal value of voltage is reached by the incoming signal (on grid 36). In other words, all signal information on grid 36 more positive than a given value (determined largely by the setting of the clipper potentiometer 38) will be passed by tube 18, and all signal information more negative will be rejected. Thus, only the sync information (since this is the only signal information more positive than the "given value" above referred to) appears at the anode 41 of tube 18, and the sync is separated.

The polarity of the separated sync is negative at anode 41, as indicated by the waveform adjacent such anode, and is approximately constant in amplitude for all settings of the video gain control potentiometer 1, for a given setting of the clipper control 38, due largely to the ganging of the controls on potentiometers 30 and 1, as previously described. The variable clipping level feature (variation of potentiometer 38) makes the sync separator circuit flexible. This clipping level control might be used, for example, to move the separation level more positive, to prevent spikes and overshoots from actuating the clamp circuit, in a severe case.

The separated sync is used to operate the pulse former circuit of the invention, and for this purpose the negative-going sync pulses appearing at the anode 41 are coupled by way of a capacitor 42 to the control grid 43 of the pulse former tube 19, which may for example be the pentode section of a type 6U8 vacuum tube. A leak resistor 44 is connected between the grid 43 and ground or the cathode of tube 19.

A critically-damped resonant circuit 45, having a resonant frequency of approximately 300 kc., is connected in the anode circuit of tube 19, between the anode 46 of this tube and the positive terminal of the unidirectional anode potential source. Circuit 45 comprises a resistor 47, a capacitor 48 and an inductor 49, all connected in parallel.

The pulse former tube 19 is normally conducting, due to the essentially zero bias effective on its grid 43. This tube will, after being cut off by an input signal, return to a conducting state in the absence of the input signal. In operation, the pulse former 19, normally conducting, is cut off by the leading edge of the negative-going sync pulses from the sync separator 18, applied to grid 43 from anode 41 by way of capacitor 42. With anode current cut off, the energy stored in the parallel resonant RLC circuit 45 causes a voltage to build up across this circuit. This voltage is approximately sinusoidal and because the value of resistor 47 is chosen to produce critical damping, only one-half of a sine wave will be developed. The period of this half sine wave or half alternation is a function of the resonant frequency of circuit 45 and is positive in polarity, since it is developed in response to anode current cutoff in tube 19. This positive polarity half sine wave is developed in response to the leading edge of sync and thus occurs during sync interval. This half alternation, at the 300-kc. resonant frequency of circuit 48, is of less than two microseconds' duration.

When the sync pulse passes, that is, at the trailing edge of sync, the negative pulse applied to grid 43 from anode 41 disappears and tube 19 goes back into conduction. This causes another transient voltage to be developed across the parallel resonant circuit 45, which is nearly identical to that developed across this circuit when anode current cutoff occurs, except that the laterdeveloped half sine wave or half alternation is of the opposite polarity. Again, because of critical damping only one-half of a sine wave is developed and this half alternation, developed in response to the going back into conduction of tube 19, is negative in polarity. This negative polarity half sine wave, being developed in response to the trailing edge of sync, occurs during the "back porch" or blanking interval.

Because the anode (plate) resistance of the pentode 19 (which is effectively in parallel with the RLC circuit 45) is high with respect to the resistance of the circuit, critical damping and the amplitude of the half sine wave are largely unaffected.

The waveform adjacent anode 46 illustrates the type of signal produced at the anode and just described, that is, a positive half-alternation or half-sine-wave followed by a negative half-alternation or half-sine-wave.

The final pulses for the keyed clamp circuit are derived from the signal just described, the signal developed at anode 46. "Back porch" clamping is generally preferred, so that it is the second or negative-going half alternation, occurring immediately after the trailing edge or after the passage of sync, which is of interest and which is used. There is, however, nothing to prevent the use of the other (positive-going) half alternation if peak of sync clamping is desired, as its timing is correct for doing so. As will be described hereinafter, the pulse former is followed by a clipper to remove the unused one of the two pulses (half alternations) described, and a phase splitter to provide the final keying pulses. Some amplitude saturation is included to square up the tips of the final pulses.

The keying pulse actually used for "back porch" clamping is that occurring as tube 19 goes back into conduction. However, tube 19 will return to a conducting state in the absence of any input signal, so that, actually, the generation of the used pulse depends on cutting off tube 19, since otherwise no pulse will result to use. In other words, tube 19 must be cut off before the desired negative-going pulse can appear at its anode 46. Therefore, it may be said that the operation of the pulse former depends primarily on anode current cutoff in tube 19, and as a result the operation can be made insensitive to the precise shape and/or rise time of the sync pulse. Since the normal sync pulse is approximately five microseconds long and the duration of the normal keying pulse (developed by pulse former 19) is less than two microseconds, the sync duration can shorten considerably without interfering with the production and proper separation of the positive-going and negative-going pulses developed at anode 46. For purposes of maximum efficiency of operation and proper separation of the positive-going and negative-going pulses developed at anode 46, the duration of each pulse developed at anode 46 (that is, the duration of each half sine wave) should not exceed the duration of the normal synchronizing pulse. The self-resonant frequency of circuit 45 should be made sufficiently high so that the aforesaid relation between the durations of the various pulses holds true.

The amplitude of the separated sync at anode 41 can easily be made as much larger than that necessary to produce anode current cutoff in tube 19 as the degree of amplitude reduction immunity warrants. In this connection, it may be noted that anode current cutoff (in tube 19) is the same if the tube is just barely cut off or cut off with a signal several times as large as barely necessary. This gives the opportunity to provide a considerable reserve of amplitude capability to take care of tube aging in the chain ahead of the pulse former, power supply variations, input signal degradations (sudden reduction in sync amplitude, for example), etc. without deterioration of the keying pulse generation.

In this connection, it is to be noted that the present invention extends the permissible operating range of sync amplitude due to variations ahead of the modulator input, as compared to other circuits. This becomes important on net work feeds where no stabilizing amplifier is used. It is not at all unusual for the sync amplitude coming in from the network to vary over a range of 2:1, and ordinarily a stabilizing amplifier, connected between the network feed point and the transmitter input, is required to take care of this variation and feed a constant-sync-amplitude signal to the transmitter. However, in the circuit of this invention, because of the substantial reserve on the separated sync amplitude, the input sync amplitude can change considerably without any loss of stability in clamping, so that the formerly-required stabilizing amplifier can be dispensed with. In fact, the sync amplitude can change as much as the reserve provided, which may be 2.5 or 3 to 1.

The amplitude and shape of the keying pulse depend on the characteristics of the network 45 and are substantially independent of the amplitude and shape of the input synchronizing pulse. The amplitude of the pulse generated in not limited by the available anode supply voltage. The amplitude of the pulse is a function only of the quiescent anode current (which to a first approximation is independent of the anode voltage in a pentode, such as tube 19) and the resistance in the circuit. The pulse amplitude can, therefore, exceed the anode supply voltage under certain conditions.

The need for a pulse transformer, as commonly used heretofore for the generation of keying pulses, is eliminated by the use of this invention. This results in a substantial saving in cost. Furthermore, the duration of the keying pulse is easily adjustable, by the replacement of an inexpensive component in circuit 45 with another, equally inexpensive and readily obtainable. When a transformer is used, it can be appreciated that this sort of change (change in the duration of the keying pulse) requires in general the replacement of the entire transformer. In addition, the ability to "get at" the components of the circuit makes the maintenance easier.

A rather common type of signal degradation is the reduction in duration of the back porch, especially at points distant from the originating station. This sort of degradation can be readily accommodated, if necessary, because of the ease of changing the keying pulse duration with this invention. If the keying pulse length exceeds the back porch length, so-called "clamp streaking" appears in the picture, because of the attempt of the clamp circuit to clamp on picture information.

The keying pulse generator of this invention also has another advantage. Keying pulses should be generated directly following the equalizing pulses of the composite TV signal, because it is better to certainly maintain the D. C. level constant. Previous arrangements incorporating pulse transformers had some difficulty in this regard, because the equalizing pulses are of half the width, and occur at double the repetition rate, of the horizontal sync pulses. If the pulse transformer is designed with the proper parameters determined by the period of the sync pulse, it is difficult to either generate or maintain a constant amplitude keying pulse during the equalizing period. However, the circuit of the present invention can generate keying pulses directly following the equalizing pulses. The reason that this circuit can ignore the length and repetition rate of the separated sync goes back to the fact that as long as cutoff occurs in the pulse former, a keying pulse will be generated. An equalizing pulse can cut off the pulse former as well as a sync pulse.

The signal appearing at the anode 46 is applied through a coupling capacitor 50 and a resistor 51 to the grid 52 of the vacuum triode 20, which operates as a clipper to remove the positive alternation and to invert and amplify the negative alternation. Triode 20 may be the other half (triode half) of the type 6U8 tube the pentode half of which is tube 19. The grid 52 is returned to approximately +250 v. through a resistor 53 of rather large resistance, while the cathode 54 of tube 20 is connected to ground through a small resistor 55.

Because of the high value of resistor 53, grid 52 assumes a potential very nearly equal to that of the cathode 54. Anode voltage is supplied to the anode 56 of tube 20 through a dropping resistor 57 and also through another resistor 58. Because of the small value of resistor 55 in circuit with the cathode 54, and also because the anode current through tube 20 is quite low, due to the dropping resistor 57, the cathode potential of this tube, and therefore the grid potential thereof, is very nearly zero.

The positive-going pulses appearing at anode 46, and supplied to grid 52, try to pull the grid 52 positive with respect to the cathode 54, causing grid current to flow. This grid current develops a voltage drop across the series grid resistor 51, which voltage drop is in series with, and in opposing polarity to, the applied positive voltage pulses. The net effect is that the grid to cathode voltage of tube 20 changes only slightly in response to a positive pulse fed thereto. This is indicated by the waveform adjacent the junction of items 51 and 53, wherein there is only a slight voltage change in the positive direction, on the order of 2.2 volts, for example. Thus, the clipper 20 effectively removes the positive alternation appearing at anode 46 and only a slight negative pulse, on the order of two volts, for example, appears at anode 56 in response to the slight grid voltage change in the positive direction, as indicated by the waveform adjacent the junction of items 56 and 58.

On the other hand, negative-going pulses appearing at anode 46 pull the grid 52 negative without opposition, and so reduce the anode current in tube 20, developing a positive pulse of voltage at the anode 56. This is represented by the large negative-going input pulse, on the order of thirteen volts, in the waveform at grid 52 and by the large positive pulse, on the order of thirty-eight volts, in the waveform at anode 56. Thus, there is amplification in tube 20 of the negative-going input pulse fed to grid 52. The clipper 20 inverts and amplifies the negative alternation appearing at anode 46, and the positive pulse appearing at anode 56 of tube 20 is used in the phase splitter 21.

The grid current flow in tube 20, resulting from positive-going pulses applied to grid 52, accounts for the fact that the symmetry of the waveform at anode 46 is offset the way it is. If tube 20 could be removed, the positive-going pulse at anode 46 would be the larger, rather than the opposite, as illustrated. This is because tube 19 is conducting when the negative-going pulse is formed at anode 46, and so the anode (plate) resistance of tube 19 is in parallel with the critically-damped circuit 45; this would increase the damping and reduce slightly the amplitude of the developed (negative-going) voltage. However, since tube 20 is driven into grid current by the positive-going pulse at grid 52, this loads or damps the tuned circuit 45 slightly more than the damping by tube 19 of the negative-going pulse (which is still present, of course), and so the symmetry is offset in the opposite direction, with the positive-going pulse smaller than the negative-going pulse, as represented by the waveform adjacent anode 46.

The selected positive-going pulse at anode 56 (which pulse is selected by the action of clipper 20, as previously described) is coupled through a capacitor 59 to the control grid 60 of a pentode vacuum tube 21, for example a type 6CL6 tube, connected to operate as a phase splitter or phase inverter. A leak resistor 62 is coupled from grid 60 to ground. Identical-valued resistors 63 and 64 are connected to the cathode 65 and the anode 66, respectively, of tube 21, and a bypass capacitor 67 is connected from anode 66 to ground. Screen grid potential is supplied to screen grid 61 of tube 21 from the positive terminal of the unidirectional source through a resistor 68, and a bypass capacitor 69 is connected from screen grid 61 to cathode 65.

The positive-going alternation appearing at anode 56 of clipper tube 20, being derived from the negative-going alternation appearing at anode 46 of pulse former tube 19, occurs during the "back porch" of the synchronizing pulse and has a duration equal to one-half cycle of the resonant frequency of resonant circuit 45, somewhat less than two microseconds. In response to a positive-going alternation supplied to grid 60 from anode 56, a negative alternation of equal duration appears across anode resistor 64 (as illustrated by the waveform adjacent the junction of items 64 and 66), and this latter alternation or pulse is supplied by way of a coupling capacitor 70 to one cathode 71 of a twin-diode clamp tube 22, for example a type 6AL5 vacuum tube. The positive-going alternation supplied to grid 60 also causes a positive alternation of equal duration to appear across cathode resistor 63 (as illustrated by the waveform adjacent the junction of items 63 and 65), and this latter alternation or pulse is supplied by way of a coupling capacitor 72 to one anode 73 of tube 22. The alternations or pulses at anode 66 and cathode 65 of the phase splitter 21 result from the increase of current in tube 21 and are of equal amplitude but opposite polarity. These are the final keying pulses used for operation of the keyed clamp circuit including clamp diode 22, although these keying pulses really have their origin in the negative-going keying pulse appearing at anode 46 of pulse former tube 19, so it may be said that the heart of the keying pulse generator of this invention is the tube 19 and its associated resonant circuit 45.

The amplitude saturation of the keying pulses, previously referred to, is accomplished in the phase splitter 21. The screen grid resistor 68 is made quite large, so that the screen to cathode voltage of tube 21 is low. This limits the maximum current through the tube, so that the peaks of the positive-going input pulses supplied to grid 60 are squared off or "saturated."

Anode 73 and cathode 71 are coupled together through two series-connected resistors 74 and 75 when the multipole switch 76 is in the "D. C." position illustrated, and the common junction of these resistors is connected through a resistor 77 to a point of fixed but adjustable bias potential determined by the position of a movable arm on a "black level" potentiometer 78 connected between two points of different potential in the power supply. In clamp diode 22, the cathode 79 associated with anode 73 and the anode 80 associated with cathode 71 are connected together and through a parallel inductor-resistor combination 81 to the grid side of capacitor 6.

Positive keying pulses are applied to anode 73 and negative keying pulses are applied to cathode 71, whereby both diodes in tube 22 are rendered conducting for the duration of these keying pulses. This permits the coupling capacitor 6 either to charge through the diode 80, 71 an additional amount or to discharge through the diode 79, 73 a certain amount, in order that the control grids 7 and 8 of tubes 9 and 10 may be driven periodically to a fixed potential determined by the voltage at the tap on potentiometer 78. Since the keying pulses supplied to the diodes of tube 22 occur during the "back porch" of the composite TV signal, "back porch clamping" of the tubes 9 and 10, and thereby of the transmitter modulator, is effected. This clamp circuit operation per se is more or less conventional and for further details reference may be had to the aforementioned Wendt patent. The video amplifier tubes 9 and 10 may together be thought of as a clamped stage.

If desired, one end of the "black level" potentiometer 78 may be coupled through a resistor 82 to the cathode of tube 10, to shift the bias (clamp level) on the radio frequency power amplifier coupled to the modulator in a positive (less negative) direction by an amount proportional to the average radio frequency power output, in accordance with the principles disclosed in my copending application, Serial No. 417,468, filed March 19, 1954. This arrangement compensates for a negative shift of the black level power output and maintains the peak radio frequency power output nearly constant.

The purpose of circuit 81 is to provide a high impedance to the color TV subcarrier components and a low impedance to the clamp current component. The inductor 83 of this circuit is self-resonant at approximately the color TV subcarrier frequency. Any tendency toward shock excitation of the inductor 83 is damped by the parallel resistor 84. This circuit allows clamping to occur in the presence of color subcarrier burst on the back porch, without adversely affecting the amplitude or phase of the burst.

When switch 76 is in the A. C. position, the clamp circuit is effectively disabled. Then, grid 60 is grounded to prevent the application of keying pulses thereto, a negative potential is applied to anode 73 to bias off diode 79, 73, a positive potential is applied to cathode 71 to bias off diode 80, 71, and a fixed bias potential (determined by the setting of the arm on potentiometer 78) is applied by way of a resistor 85 and circuit 81 to the grids 7 and 8.

If desired, the circuit can be arranged for inverse operation, that is, the pulse former 19 can be normally cut off, by returning the grid resistor 44 to a negative voltage, for example. Then, the separated sync would have to be positive-going and would drive the pulse former tube into conduction for the duration of sync and as this tube returned to cutoff a positive-going pulse would appear at the output of the pulse former. This positive-going pulse occurs in time at the same place (back porch) on the composite video signal as the negative-going pulse utilized in the previous description, hence the term "inverse operation." It would then be necessary to clip the negative-going pulse if back porch clamping were desired. Appropriate circuitry to accomplish the clipping, amplification with or without phase inversion, or whatever combination is necessary, could be employed to provide the proper polarity of separated sync and to arrive at the same waveform and polarity to feed the phase splitter 21.

With "inverse operation," the amplitude stability of the sync becomes somewhat more important, but a saving in average power consumption results. The particular arrangement chosen would depend on other considerations, such as the polarity and amplitude of the driving signal, the polarity requirements of succeeding stages, etc.

The following values for certain of the circuit components are given by way of example. These are the values used in an actual TV transmitter modulator utilizing the invention. The said transmitter modulator was built and successfully tested.

| | | |
|---|---|---|
| Resistor **1** | ohms | 200 |
| Resistor **11** | do | 33 |
| Resistor **12** | do | 33 |
| Resistor **15** | do | 47 |
| Resistor **16** | do | 47 |
| Resistor **24** | do | 680 |
| Resistor **26** | do | 3,300 |
| Resistor **29** | do | 100 |
| Resistor **30** | do | 1,000 |
| Resistor **31** | do | 470,000 |
| Resistor **35** | do | 33 |
| Resistor **37** | do | 470,000 |
| Resistor **38** | do | 20,000 |
| Resistor **39** | do | 75,000 |
| Resistor **44** | do | 150,000 |
| Resistor **47** | do | 2,700 |
| Resistor **51** | do | 2,700 |
| Resistor **53** | megohms | 1.5 |
| Resistor **55** | ohms | 100 |
| Resistor **57** | do | 22,000 |
| Resistor **58** | do | 5,600 |
| Resistor **62** | do | 100,000 |
| Resistor **63** | do | 4,700 |
| Resistor **64** | ohms | 4,700 |
| Resistor **68** | do | 150,000 |
| Resistor **74** | do | 100,000 |
| Resistor **75** | do | 100,000 |
| Resistor **77** | do | 47,000 |
| Resistor **78** | do | 20,000 |
| Resistor **82** | do | 2,200 |
| Resistor **84** | do | 4,700 |
| Resistor **85** | do | 100,000 |
| Capacitor **2** | mfd | 0.22 |
| Capacitor **6** | mfd | .0022 |
| Capacitor **25** | mfd | 0.22 |
| Capacitor **32** | mmfd | 150 |
| Capacitor **34** | mfd | 0.1 |
| Capacitor **42** | mfd | 0.22 |
| Capacitor **48** | mmfd | 150 |
| Capacitor **50** | mfd | .047 |
| Capacitor **59** | mfd | .0047 |
| Capacitor **67** | mmfd | 5 |
| Capacitor **69** | mfd | 0.1 |
| Capacitor **70** | mfd | .01 |
| Capacitor **72** | mfd | .01 |
| Inductor **83** | mh | 1 |

What is claimed is:

1. In a television transmitter, a clamp system comprising a multi-electrode electron discharge device having an anode electrode; a critically-damped resonant circuit connected to said anode electrode, means for applying a television synchronizing pulse to said device to vary the anode current flow therein, the transient variations of anode current in response to the leading and trailing edges of said pulse causing two corresponding pulses of opposite polarities to be developed across said resonant circuit, means receptive of said developed pulses for clipping off that one of said developed pulses having a predetermined polarity, the output of said clipping means thereby comprising a pulse whose polarity is opposite to said predetermined polarity, means including a phase splitter receptive of the output of said clipping means for deriving from said opposite polarity pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

2. In a television transmitter, a clamp system comprising a multi-electrode electron discharge device having anode, cathode, and control electrodes; a critically-damped resonant circuit connected to said anode electrode, means for applying a television synchronizing pulse to said control electrode to vary the anode current flow in said device, the transient variations of anode current in response to the leading and trailing edges of said pulse causing two corresponding pulses of opposite polarities to be developed across said resonant circuit, means receptive of said developed pulses for clipping off that one of said developed pulses having a predetermined polarity, the output of said clipping means thereby comprising a pulse whose polarity is opposite to said predetermined polarity, means including a phase splitter receptive of the output of said clipping means for deriving from said opposite polarity pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

3. In a television transmitter, a clamp system comprising a multi-electrode electron discharge device having an anode electrode; a critically-damped resonant circuit connected to said anode electrode, means for applying a television synchronizing pulse to said device to vary the anode current flow therein, the transient variations of anode current in response to the leading and trailing edges of said pulse causing two corresponding pulses to be developed across said resonant circuit, one of said developed pulses being of positive polarity and the other of negative polarity, means receptive of said developed pulses for clipping off said developed positive pulse, the output of said clipping means thereby comprising a negative pulse, means including a phase splitter receptive of the output of said clipping means for deriving from said negative pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

4. In a television transmitter, a clamp system comprising a multi-electrode electron discharge device having anode, cathode, and control electrodes; a critically-damped resonant circuit connected to said anode electrode, means for applying a television synchronizing pulse to said control electrode to vary the anode current flow in said device, the transient variations of anode current in response to the leading and trailing edges of said pulse causing two corresponding pulses to be developed across said resonant circuit, one of said developed pulses being of positive polarity and the other of negative polarity, means receptive of said developed pulses for clipping off said developed positive pulse, the output of said clipping means thereby comprising a negative pulse, means including a phase splitter receptive of the output of said clipping means for deriving from said negative pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

5. In a television transmitter, a clamp system comprising means receptive of a composite video signal including both picture signals and synchronizing pulses for separating therefrom and passing on the synchronizing pulses, a multi-electrode electron discharge device having an anode electrode; a critically-damped resonant circuit connected to said anode electrode, means for applying said separated synchronizing pulses to said device to vary the anode current flow therein, the transient variations of anode current in response to the leading and trailing edges of each of said pulses causing two corresponding pulses of opposite polarities to be developed across said resonant circuit, means receptive of said developed pulses for clipping off that one of said developed pulses having a predetermined polarity, the output of said clipping means thereby comprising a pulse whose polarity is opposite to said predetermined polarity, means including a phase splitter receptive of the output of said clipping means for deriving from said opposite polarity pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

6. In a television transmitter, a clamp system comprising means receptive of a composite video signal including both picture signals and synchronizing pulses for separating therefrom and passing on the synchronizing pulses, a multi-electrode electron discharge device having anode, cathode, and control electrodes; a critically-damped resonant circuit connected to said anode electrode, means for applying said separated synchronizing pulses to said control electrode to vary the anode current flow in said device, the transient variations of anode current in response to the leading and trailing edges of each of said pulses causing two corresponding pulses to be developed across said resonant circuit, one of said developed pulses being of positive polarity and the other of negative polarity, means receptive of said developed pulses for clipping off said developed positive pulse, the output of said clipping means thereby comprising a negative pulse, means including a phase splitter receptive of the output of said clipping means for deriving from said negative pulse a pair of pulses similar to each other but of opposite polarities; a double diode keyed clamp circuit operatively associated with said transmitter, and means for utilizing concurrently both of said last-mentioned pair of pulses as the two keying pulses for said clamp circuit.

References Cited in the file of this patent

UNITED STATES PATENTS

| | | |
|---|---|---|
| 2,636,162 | Sinclair | Apr. 21, 1953 |
| 2,641,700 | Hoeppner | June 9, 1953 |
| 2,676,254 | Valeton | Apr. 20, 1954 |
| 2,740,071 | Holdmark | Mar. 27, 1956 |